United States Patent
Kinder et al.

(10) Patent No.: US 10,933,846 B2
(45) Date of Patent: Mar. 2, 2021

(54) SYSTEM, METHOD, COMPUTER PROGRAM AND CONTROL UNIT FOR PREVENTING A VEHICLE FROM ROLLING AWAY

(71) Applicant: Lucas Automotive GmbH, Koblenz (DE)

(72) Inventors: Ralf Kinder, Kadenbach (DE); Heiner Versmold, Urbar (DE)

(73) Assignee: ZF Active Safety GmbH, Koblenz (DE)

( * ) Notice: Subject to any disclaimer, the term of this patent is extended or adjusted under 35 U.S.C. 154(b) by 375 days.

(21) Appl. No.: 15/877,960

(22) Filed: Jan. 23, 2018

(65) Prior Publication Data
US 2018/0215355 A1      Aug. 2, 2018

(30) Foreign Application Priority Data
Feb. 2, 2017      (DE) .......................... 102017000954.6

(51) Int. Cl.
| | | |
|---|---|---|
| B60T 7/12 | (2006.01) | |
| B60T 13/74 | (2006.01) | |
| B60T 8/172 | (2006.01) | |
| B60T 8/171 | (2006.01) | |
| B60T 8/24 | (2006.01) | |

(52) U.S. Cl.
CPC .............. *B60T 7/12* (2013.01); *B60T 7/122* (2013.01); *B60T 8/171* (2013.01); *B60T 8/172* (2013.01); *B60T 8/245* (2013.01); *B60T 13/74* (2013.01); *B60T 2201/06* (2013.01)

(58) Field of Classification Search
CPC . B60T 7/12; B60T 7/122; B60T 8/245; B60T 8/171; B60T 2201/06; B60T 13/74; B60T 8/172
See application file for complete search history.

(56) References Cited

U.S. PATENT DOCUMENTS

| | | | |
|---|---|---|---|
| 5,984,429 A * | 11/1999 | Nell ........................ | B60T 7/042 303/113.4 |
| 6,394,235 B1 | 5/2002 | Poertzgen et al. | |
| 6,814,414 B1 | 11/2004 | Schmitt et al. | |
| 7,338,137 B2 | 3/2008 | Kinder et al. | |
| 9,789,863 B2 | 10/2017 | Straub et al. | |
| 2001/0023799 A1* | 9/2001 | Engelhard ............... | B60T 13/74 188/151 R |
| 2006/0186731 A1 | 8/2006 | Bach | |
| 2008/0195289 A1* | 8/2008 | Sokoll ..................... | B60T 7/122 701/70 |
| 2008/0294319 A1* | 11/2008 | Baijens .................... | B60T 8/24 701/70 |

(Continued)

FOREIGN PATENT DOCUMENTS

| | | |
|---|---|---|
| DE | 19732168 C1 | 1/1999 |
| DE | 19941482 A1 | 4/2000 |

(Continued)

*Primary Examiner* — Russell Frejd
(74) *Attorney, Agent, or Firm* — Robert James Harwood

(57) ABSTRACT

A system and a method for preventing a vehicle from rolling away are described. According to one method aspect, in the case of a vehicle equipped with several EPB actuators, the activation of only one of these EPB actuators takes place if in the case of a road inclination lying below a threshold value the vehicle begins to roll away from the stationary state.

9 Claims, 6 Drawing Sheets

(56) References Cited

U.S. PATENT DOCUMENTS

| | | | | |
|---|---|---|---|---|
| 2009/0305848 A1* | 12/2009 | Straub | ............... | B60T 7/107 |
| | | | | 477/184 |
| 2010/0090522 A1* | 4/2010 | Bensch | ............... | B60T 13/261 |
| | | | | 303/122.15 |
| 2010/0252378 A1* | 10/2010 | Hilberer | ............... | B60T 13/683 |
| | | | | 188/106 F |
| 2011/0005874 A1* | 1/2011 | Beier | ............... | B60T 13/26 |
| | | | | 188/106 F |
| 2011/0147144 A1* | 6/2011 | Ma | ............... | B60T 13/741 |
| | | | | 188/162 |
| 2013/0184954 A1* | 7/2013 | Treppenhauer | ............... | B60T 13/662 |
| | | | | 701/70 |
| 2013/0226423 A1* | 8/2013 | Baehrle-Miller | ............... | B60T 13/741 |
| | | | | 701/70 |
| 2016/0355164 A1* | 12/2016 | Gottlieb | ............... | B60T 7/122 |

FOREIGN PATENT DOCUMENTS

| | | |
|---|---|---|
| DE | 10063061 A1 | 6/2002 |
| DE | 10351026 B3 | 6/2005 |
| DE | 102005024834 B3 | 1/2007 |
| DE | 102006061656 A1 | 7/2008 |

\* cited by examiner

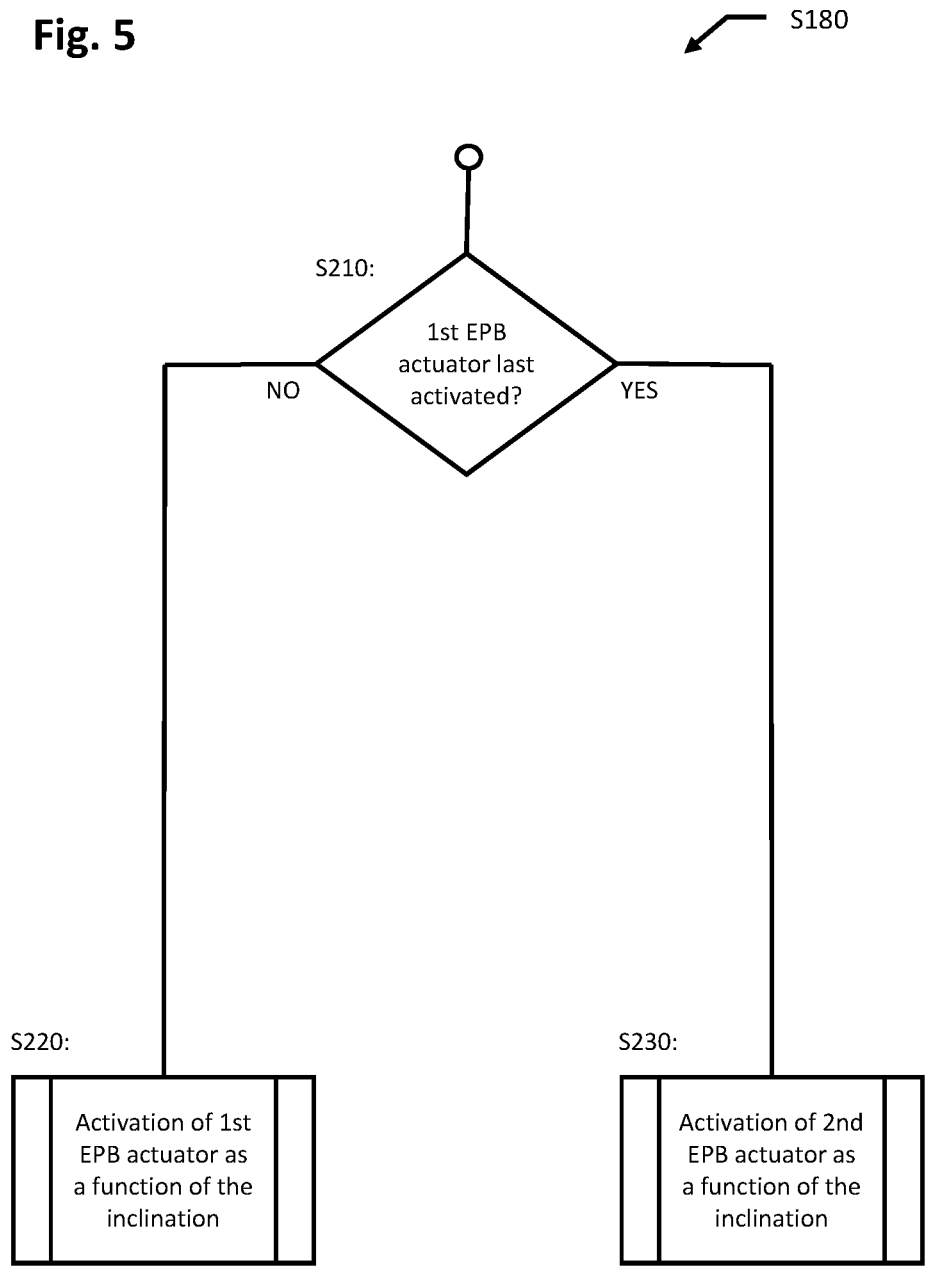

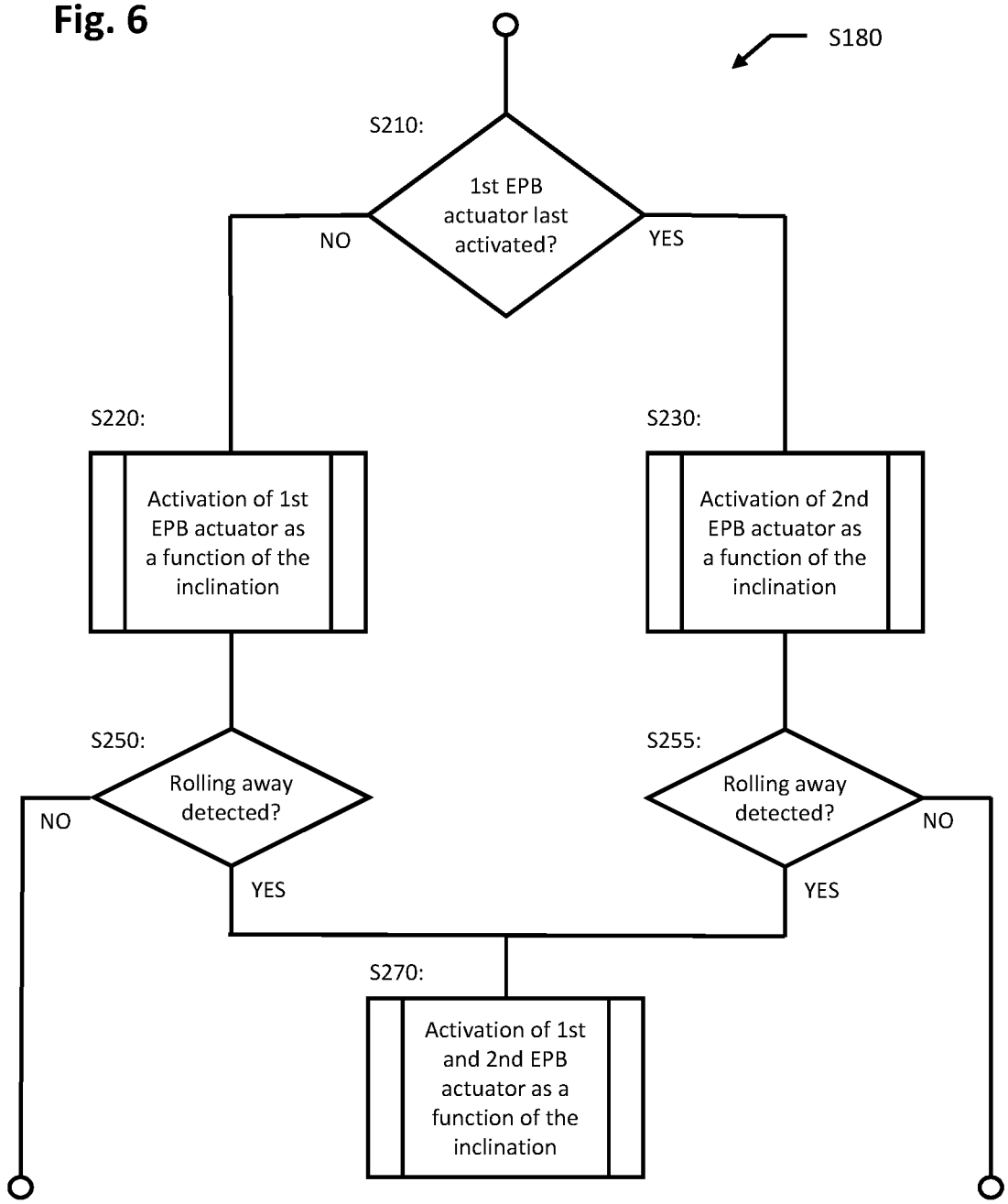

SYSTEM, METHOD, COMPUTER PROGRAM AND CONTROL UNIT FOR PREVENTING A VEHICLE FROM ROLLING AWAY

CROSS-REFERENCE TO RELATED APPLICATIONS

This application claims priority to German Patent Application No. 10 2017 000 954.6, filed 2 Feb. 2017, the disclosures of which are incorporated herein by reference in entirety.

BACKGROUND OF THE INVENTION

The present invention relates generally to the field of motor vehicle braking systems. Specifically, preventing a vehicle from rolling away with the aid of an electric parking brake installed in the vehicle is described.

Electric parking brakes (EPB) have been introduced into a great number of modern motor vehicles and conventionally comprise two electric actuators, which are termed EPB actuators below.

In a hydraulic motor vehicle braking system, the EPB actuators are typically installed on the wheel brakes of two opposing vehicle wheels and facilitate electric actuation of a respective wheel brake cylinder in parking brake operation (details of this are to be found in DE 197 32 168 A, for example). In normal brake operation, on the other hand, the wheel brake cylinders are actuated hydraulically. For this purpose the wheel brake cylinders are in fluid connection with a hydraulic pressure source. This hydraulic pressure source can comprise a main cylinder or an electrically operated hydraulic pump, for example.

A method is known from DE 103 51 026 A for stabilizing a vehicle braked to a standstill by means of an EPB. In this, after reaching the standstill, a first brake power to be generated by the EPB is determined, which brake power is sufficient to prevent the vehicle from rolling away. Then a second brake power, which is greater in amount than the first brake power, is generated by an electrically operated hydraulic pump. As soon as this second brake power has been generated hydraulically, a brake power build-up by means of the EPB takes place. If the first brake power has then been built up by the EPB, the hydraulic pressure is relieved again. Following the relieving of the hydraulic pressure, the vehicle is then held at a standstill exclusively by means of the EPB.

It has proved to be the case that the servicing work on motor vehicles is becoming increasingly complex on account of the growing number of components installed therein. This observation also applies to the braking system. In particular, the EPB actuators are operated very frequently to prevent the vehicle from rolling away. The EPB actuators are accordingly subjected to high wear and a correspondingly high maintenance effort.

Another observation concerns the fact that the method described in DE 103 51 026 A can only be executed if an electrically operated hydraulic pump and other electric and hydraulic components are present. Such components are installed as standard in modern vehicles in connection with a vehicle dynamics control system (also termed Electronic Stability Control, ESC). Furthermore, these components can also be used to implement comfort functions such as a starting assistance system. The function of such a starting assistance system is described in DE 100 63 061 A, for example.

In vehicles without a vehicle dynamics control system but equipped with an EPB, a driver-independent interplay of hydraulic and mechanical brake force generation and thus an implementation of the method described in DE 103 51 026 A and similar methods are normally eliminated. However, certain comfort functions such as the aforementioned starting assistance system must then usually also be eliminated.

BRIEF SUMMARY OF THE INVENTION

The present disclosure is based on the object of avoiding one or more of the aforesaid disadvantages.

According to a first aspect, a system is specified for preventing a vehicle from rolling away. The system comprises an EPB with a first EPB actuator, which is assigned to a first vehicle wheel, and a second EPB actuator, which is assigned to a second vehicle wheel. The system further comprises a first device, which is formed to generate a first signal, which indicates a road inclination, and a second device, which is formed to generate a second signal, which indicates a state of motion of the vehicle. The system is further formed to activate one of the two EPB actuators to generate a brake force at either the first vehicle wheel or the second vehicle wheel if the following conditions have occurred together: the first signal indicates a road inclination below a first threshold value and the second signal indicates a rolling away of the vehicle from the stationary state.

In the case of a road inclination below the first threshold value, in the event of a detected rolling away of the vehicle according to one implementation a brake force is generated only by means of one of the two EPB actuators. If a brake force is generated in this case at the first vehicle wheel, no brake force is generated at the second vehicle wheel. If a brake force is generated at the second vehicle wheel, on the other hand, no brake force is generated at the first vehicle wheel.

The aforesaid (and if applicable one or more other) conditions for the activation of one of the two EPB actuators can occur in any order or also simultaneously. The conditions are regarded as having occurred together if they occur in the context of a predetermined process cycle. The process cycle can comprise individual, consecutive steps for testing the individual conditions.

To evaluate the conditions, the system can comprise at least one control unit, which is coupled at least to the first device and the second device. The at least one control unit can further be formed to activate the EPB actuators or be coupled to another control unit provided to activate the EPB actuators.

The EPB actuators can be based on an electromechanical principle. In other variants the electric parking brake actuators can be operated electrohydraulically or electropneumatically.

In one configuration the system is part of a hydraulic vehicle braking system. In this case the activation of the one of the two EPB actuators can take place in a state of the braking system devoid of hydraulic pressure. In particular, neither a hydraulically generated brake pressure requested by the driver nor a brake pressure generated hydraulically by the system independently of a driver request can prevail in this case.

The system, and in particular a control unit of the system, can be formed to monitor a course of the second signal over time. This monitoring can serve the purpose of detecting rolling away following a detected stationary state of the vehicle. The stationary state and the rolling away of the vehicle must therefore be detected consecutively in time in this case, so that the corresponding condition "rolling away of the vehicle from the stationary state" can be detected.

According to one variant, the system further comprises a third device, which is formed to generate a third signal, which indicates an intention to start. The system, and in particular a control unit of the system, can be formed in this case to activate the one of the two EPB actuators in order to generate a brake force at either the first vehicle wheel or the second vehicle wheel if the following condition has occurred: no third signal is received indicating an intention to start. This condition also comprises the case of the receipt of a third signal, which explicitly indicates the absence of an intention to start.

According to another variant, the system further comprises a fourth device, which is formed to generate a fourth signal, which indicates an actuation state of a service brake of the vehicle. In this case the system, and in particular a control unit of the system, can be formed to activate the one of the two EPB actuators in order to generate a brake force at either the first vehicle wheel or the second vehicle wheel if the following further condition has occurred: no fourth signal is received indicating an actuation of the service brake. This condition comprises the receipt of a fourth signal, which explicitly indicates a non-actuation of the service brake.

According to another variant, the system further comprises a fifth device, which is configured to generate a fifth signal, which indicates an activation of an automatic starting assistance system. In this case the system, and in particular a control unit of the system, can be formed to activate the one of the two EPB actuators in order to generate a brake force at either the first vehicle wheel or the second vehicle wheel if the following further condition has occurred: the fifth signal indicates an activation of the automatic starting assistance system. The automatic starting assistance system is also termed hill hold or auto hold function.

The system can further be formed to activate both EPB actuators in order to generate a brake force at the first vehicle wheel and at the second vehicle wheel if the first signal indicates that the road inclination is above the first or a second threshold value. The second threshold value can be above the first threshold value.

The threshold values can generally be selected so that the first threshold value substantially corresponds to a flat road and the second threshold value indicates an only slight road inclination. Thus the first threshold value can amount to roughly 3 degrees or less. In particular, the first threshold value can be roughly 2 degrees. The second threshold value can lie in a range from roughly 4 degrees to roughly 8 degrees, in particular at roughly 5 degrees.

The system can further be formed to select a level of the brake force generated as a function of the road inclination. This can apply regardless of at how many wheels a brake force is generated respectively by means of the EPB actuators.

If the road inclination is below the first threshold value, the brake force can generally be less than the maximal brake force that can be generated. In the same manner, if the road inclination is above the first threshold value but below the second threshold value, the brake force generated can be below the maximal brake force that can be generated (but if applicable above the brake force generated in the case of a road inclination below the first threshold value). If the road inclination is above the second threshold value or a third threshold value, the two EPB actuators can be activated on the other hand to generate the maximal brake force that can be generated. The third threshold value can lie above the second threshold value.

The system, and in particular a control unit of the system, can be formed to select either the first EPB actuator or the second EPB actuator in order to generate a brake force at either the first vehicle wheel or the second vehicle wheel. The selection can be made as a function of an actuation history of the first EPB actuator and/or of the second EPB actuator. The actuation history can be filed in a memory of the system. For example, the actuation history can indicate how often each of the two EPB actuators was called upon to generate brake force in preceding process cycles. Alternatively or in addition to this, the actuation history can also indicate the EPB actuator by means of which a brake force was generated in the last process cycle executed.

The selection of the first EPB actuator or the second EPB actuator can generally be made so that the two EPB actuators are selected substantially alternately. A substantially alternate selection includes the case that over a plurality of process cycles both EPB actuators are selected at least approximately equally frequently.

The system, and in particular a control unit of the system, can be formed, following the activation of one of the two EPB actuators in order to generate a brake force at either the first vehicle wheel or the second vehicle wheel, to monitor the movement state of the vehicle further with reference to the second signal. In this case the brake force can be increased at the previously activated EPB actuator if it is detected that the rolling away continues or begins anew. Alternatively or in addition to this, it is possible to generate a brake force by means of the previously not yet activated EPB actuator if it is detected that the rolling away continues or begins anew.

According to another aspect, a method is specified for preventing a rolling away of a vehicle, which comprises an EPB with a first EPB actuator, which is assigned to a first vehicle wheel, and a second EPB actuator, which is assigned to a second vehicle wheel. The method comprises the step of activating one of the two EPB actuators, in order to generate a brake force at either the first vehicle wheel or the second vehicle wheel, if the following conditions have occurred together: a road inclination is below a threshold value and the vehicle begins to roll away from the stationary state.

According to one variant, the one of the two EPB actuators is activated in order to generate a brake force at either the first vehicle wheel or the second vehicle wheel if additionally at least one of the following conditions has occurred: no intention to start is present; no actuation of a service brake of the vehicle is present; an automatic starting assistance system of the vehicle is activated.

The method can comprise one or more further steps, as described above and below.

Furthermore, a computer program product is specified, which comprises program code for executing the method presented here if the program code is executed on a processor. Likewise specified is a motor vehicle control unit or a system comprising several such control units, which comprises (at least) one processor for executing the method presented here and a memory coupled to the processor, in which the corresponding computer program product is stored.

Other advantages of this invention will become apparent to those skilled in the art from the following detailed description of the preferred embodiments, when read in light of the accompanying drawings.

BRIEF DESCRIPTION OF THE DRAWINGS

FIGS. 3-6 are flow diagrams of methods according to exemplary embodiments of the present disclosure

DETAILED DESCRIPTION OF THE INVENTION

Figure 1:
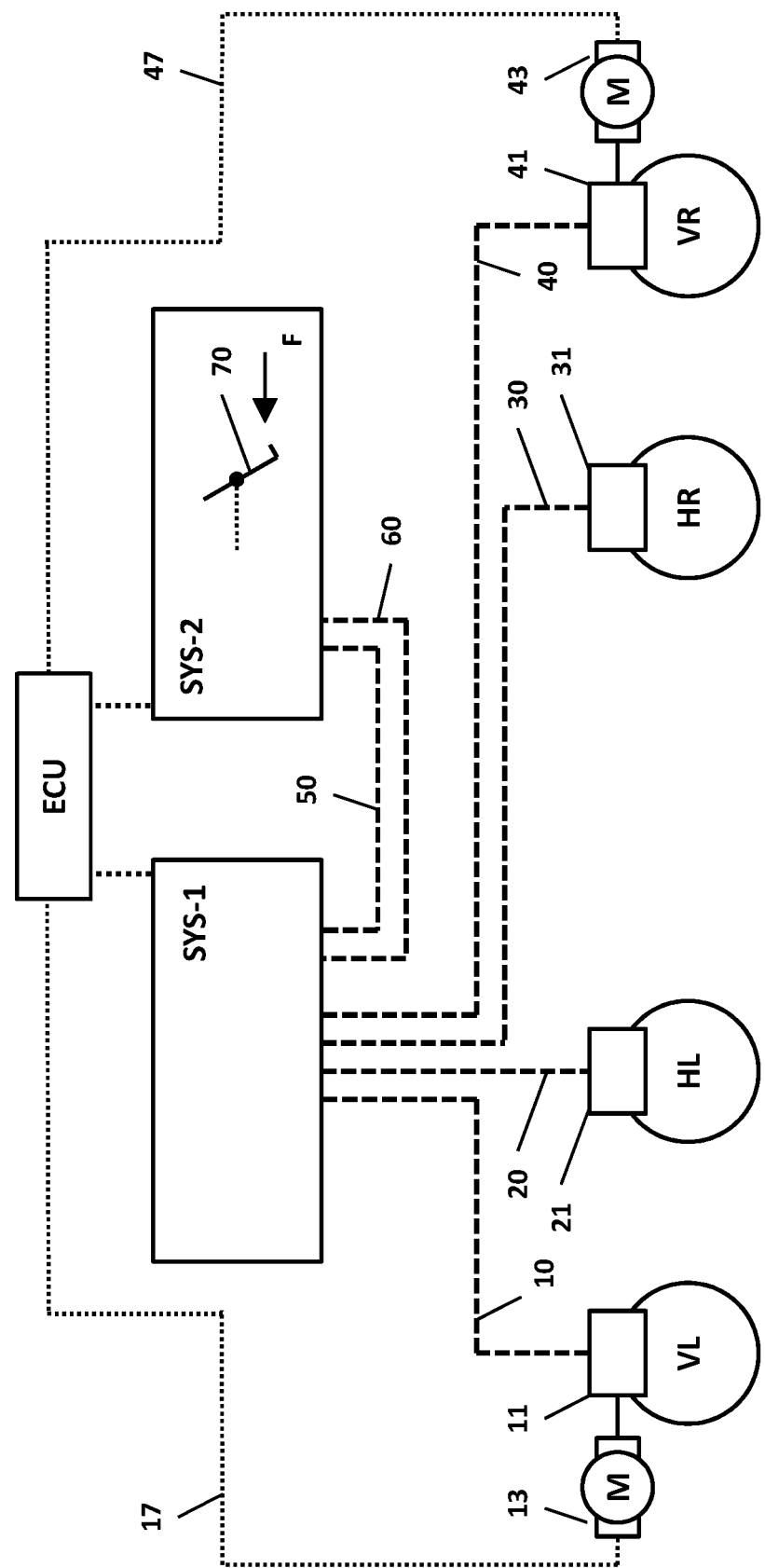
FIG. 1 is an exemplary embodiment of a motor vehicle braking system.

In FIG. 1, components of a motor vehicle braking system are shown schematically. The braking system comprises a first subsystem SYS-1, a second subsystem SYS-2, at least one electronic control unit (ECU), four hydraulically actuatable wheel brakes 11, 21, 31, 41 and at least two EPB actuators 13, 43. Each of the two subsystems SYS-1 and SYS-2 as well as the at least two EPB actuators 13, 43 are formed to generate a brake force at least one subset of the four wheel brakes 11, 21, 31, 41.

In the exemplary embodiment shown in FIG. 1, the control unit ECU facilitates an activation of the two subsystems SYS-1 and SYS-2 as well as of the at least two EPB actuators 13, 43. In other exemplary embodiments the activation could even be taken over by two or more control units. In particular, a separate control unit could be provided for each of the two EPB actuators 13, 43 for redundancy reasons. At least one of these redundantly provided control units could further be formed to activate at least one of the two subsystems SYS-1 and SYS-2.

Connected to the first subsystem SYS-1, put more precisely to a hydraulic control unit (HCU) of the same, which unit is not shown in FIG. 1, via hydraulic lines 10, 20, 30 and 40 are the wheel brakes 11, 21, 31 and 41. In the exemplary embodiment the first subsystem SYS-1 is a system which facilitates a driver-independent, individual generation and adjustment of the brake pressures in the wheel brakes 11, 21, 31 and 41. The first subsystem SYS-1 can implement, for example, an anti-lock braking system and/or vehicle dynamics control system (ABS and/or Electronic Stability Control, ESC) that is now standard in vehicles. In a low-cost variant the first subsystem SYS-1 could implement purely an ABS function.

The second subsystem SYS-2 is connected by hydraulic lines 50, 60 to the first subsystem SYS-1 and is designed to generate brake pressures for the first subsystem SYS-1 and/or the wheel brakes 11, 21, 31 and 41. To understand the possibilities that result from the "and/or" link between the terms "the first subsystem SYS-1" and "the wheel brakes 11, 21, 31 and 41", let the following variants be explained by way of example:

The second subsystem SYS-2 generates the brake pressures via the hydraulic lines 50, 60 directly for the wheel brakes 11, 21, 31 and 41 when the first subsystem SYS-1 is passive, thus does not execute any (e.g. superimposed) wheel-individual control interventions, such as an ABS or ESC control, for example. For this purpose the second subsystem SYS-2 can comprise a main cylinder that is actuatable by a brake pedal 70 and/or an electrically activatable hydraulic pressure generator (e.g. an electrically operated hydraulic pump).

If the first subsystem SYS-1 is active, however, in order to execute e.g. an ABS or ESC control, then in some variants the second subsystem SYS-2 can supply the first subsystem SYS-1 with brake pressures on the input side via the hydraulic lines 50, 60, so that the first subsystem SYS-1 can adjust brake pressures for the wheel brakes 11, 21, 31 and 41 in a wheel-individual manner on the output side (e.g. by maintaining, increasing or lowering the brake pressure). Such an adjustment can take place even if the second subsystem SYS-2 does not supply any brake pressures. For this purpose the first subsystem SYS-1 comprises a separate brake pressure generator (e.g. an electrically operated hydraulic pump) in some variants.

Since individual control interventions are not always necessary at all wheel brakes 11, 21, 31, 41 at the same time, e.g. if only a front wheel on the outside of the curve is to be braked as part of an ESC control, in order to prevent understeering of the vehicle, combinations of the two aforesaid possibilities are normal in practical operation.

The two EPB actuators 13, 43 are provided to be able to hold the vehicle securely in a stationary state. Both actuators 13, 43 are based on an electromechanical principle, for example. A variant of this principle is described in DE 197 32 168 A, the disclosure content of which in respect of structure and mode of operation of the actuators 13, 43 is hereby taken over.

The actuator 13 acts in the exemplary embodiment on the wheel brake 11 assigned to the front left wheel VL and the actuator 43 on the wheel brake 41 assigned to the front right wheel VR, as the front wheels VL, VR can transmit a greater brake force share than the rear wheels HL, HR on account of the dynamic axial load distribution. Naturally the two actuators 13 and 43 could also act in other exemplary embodiments on the rear wheels HL and HR of the vehicle. EPB actuators could also be provided at all four wheels VL, VR, HL, HR.

According to FIG. 1, the actuator 13 is activated via a control line 17 and the actuator 43 via a control line 47 by the control unit ECU. An input device (e.g. a switch or button), which is not shown in FIG. 1, enables the driver to enter his activation command for a standard "park" mode, in order to stop the vehicle permanently. The activation command—typically "close parking brake" or "open parking brake"—is detected and evaluated by the control unit ECU. According to the result of the evaluation, both actuators 13, 43 are then actuated by the control unit ECU.

It is also possible for the control unit ECU to actuate the EPB actuators 13, 43 independently of an operation of the input device and thus independently of an activation intention of the driver. This takes place e.g. in the context of a starting assistance system also known as auto hold or hill hold, which prevents the vehicle from rolling away on an inclined road by automatic closing of the EPB actuators 13, 43 and enables a comfortable start-up of the vehicle on the inclined road by automatic opening of the EPB actuators 13, 43 (e.g. as a function of the angle of inclination and/or the torque provided by the drive engine of the vehicle). Furthermore, the EPB actuators 13, 43 can be activated by the control unit ECU in order to execute braking or emergency braking autonomously, in particular as a fallback option in remote controlled parking (RCP) operation, for example.

Figure 2:
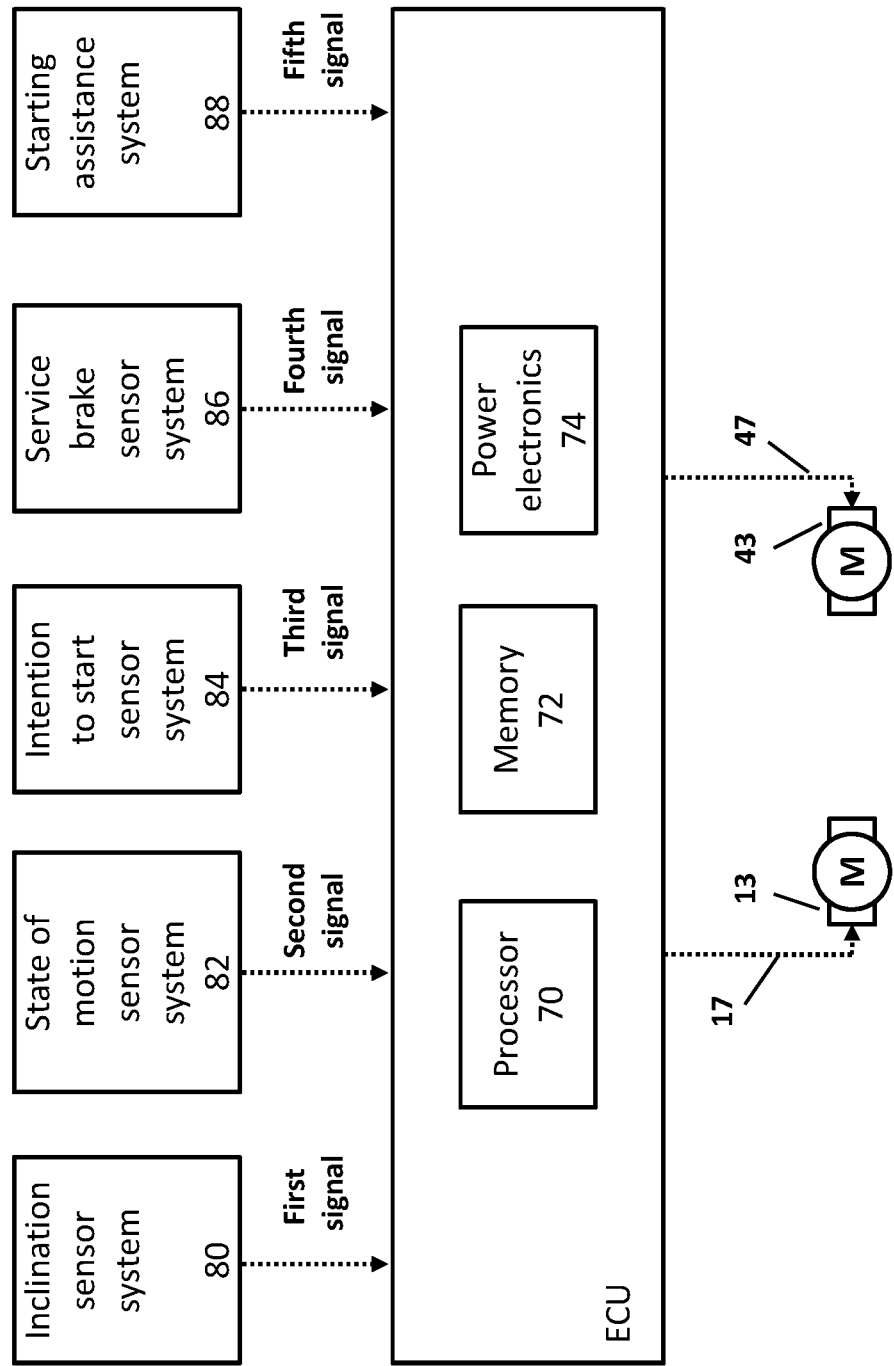
FIG. 2 is an exemplary embodiment of a control unit for the motor vehicle braking system according to FIG. 1.

In a schematic view, FIG. 2 shows an exemplary embodiment of the control unit ECU from FIG. 1 for activation of the two EPB actuators 13, 43. It is self-evident that the control unit ECU shown in FIG. 2 can be used in braking systems that deviate from the system from FIG. 1. It is also self-evident that the functions of the control unit ECU described below with reference to FIG. 2 could also be distributed to a system of two or more control units. It is thus conceivable in particular to assign a separate control unit ECU with the interfaces shown in FIG. 2 to each of the two EPB actuators 13, 43 for redundancy reasons.

In the exemplary embodiment according to FIG. 2, the control unit ECU comprises a processor 70 and a memory 72 linked to the processor 70. In the memory 72, a program code is stored that can be executed by the processor 70 in connection with the activation of the EPB actuators 13, 43. Furthermore, data can be stored in the memory 72, for example in respect of an actuation history of the two EPB actuators 13, 43. The control unit ECU further comprises power electronics 74 coupled to the processor 70 for the activation of the two EPB actuators 13, 43. These power electronics contain a separate H-bridge for each of the two EPB actuators 13, 43.

The control unit ECU also comprises at least one input interface for receiving signals from various sensor systems 80-86 installed in the vehicle as well as of a starting assistance system 88. This input interface is typically formed as a connection for a vehicle communications bus, to which the various sensor systems 80-86 and the starting assistance system 88 are linked.

As illustrated in FIG. 2, the sensor systems 80-86 comprise an inclination sensor system 80, a state of motion sensor system 82, an intention to start sensor system 84 and a service brake sensor system 86.

The inclination sensor system 80 is formed to generate a first signal, which indicates a road inclination. The first signal can specify the road inclination in the form of an angle of inclination.

The state of motion sensor system 82 is formed to generate a second signal, which indicates a state of motion of the vehicle. The second signal can specify the state of motion in the form of a wheel speed or a vehicle velocity. The state of motion sensor system 82 can accordingly comprise a wheel sensor, in particular a wheel speed sensor. Alternatively or—for plausibility check purposes, for example—in addition to this, the state of motion sensor system 82 for determining velocity can comprise a sensor of a satellite navigation system.

The intention to start sensor system 84 is formed to generate a third signal indicating an intention to start (or the absence of an intention to start). For this purpose the intention to start sensor system 84 can be formed to detect an actuation, representative of a starting process, of at least one of the following actuation devices of the vehicle: accelerator pedal, clutch pedal, gear lever and automatic gear selection device.

The service brake sensor system 86 is formed to generate a fourth signal, which indicates an actuation state of a service brake of the vehicle. The service brake sensor system 86 can thus comprise one or more of the following components: a brake light switch, a path and/or force sensor installed in the area of the brake pedal, a brake pressure sensor installed, for example, in the area of a main cylinder.

The starting assistance system 88 involves the function already described above, which facilitates driver-independent actuation of the EPB actuators 13, 43, in order to enable a comfortable start-up of the vehicle on an inclined road. The starting assistance system 88 is configured to generate a fifth signal which indicates its activation. While the starting assistance system 88 in FIG. 2 is shown as an external component with regard to the control unit ECU (e.g. in the form of a separate control unit), the starting assistance system 88 can be realized in another exemplary embodiment also as a function integrated into the control unit ECU. The program code associated with the starting assistance system 88 can thus be stored in the memory 72 for execution by the processor 70.

Figure 3:
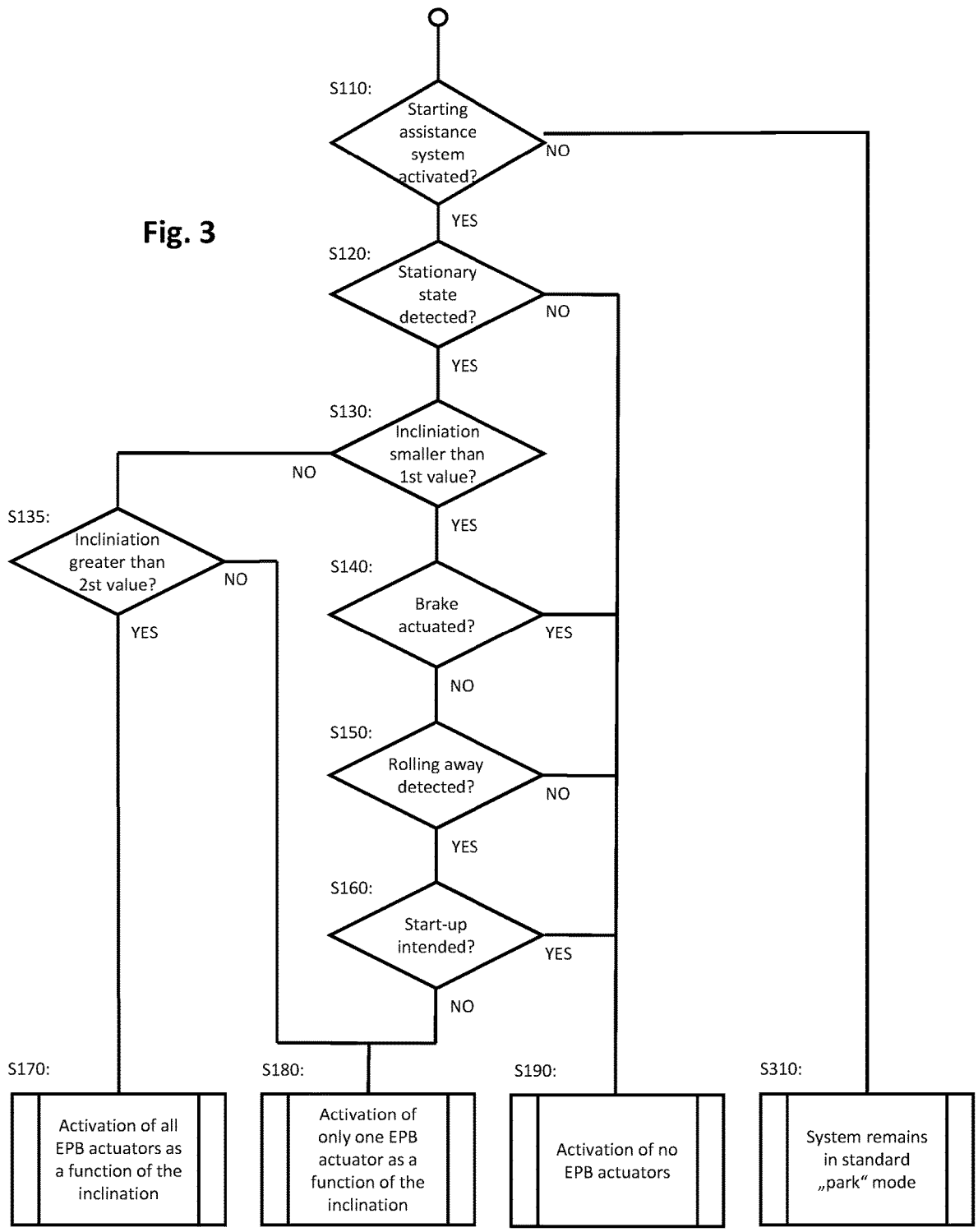
Figure 4:
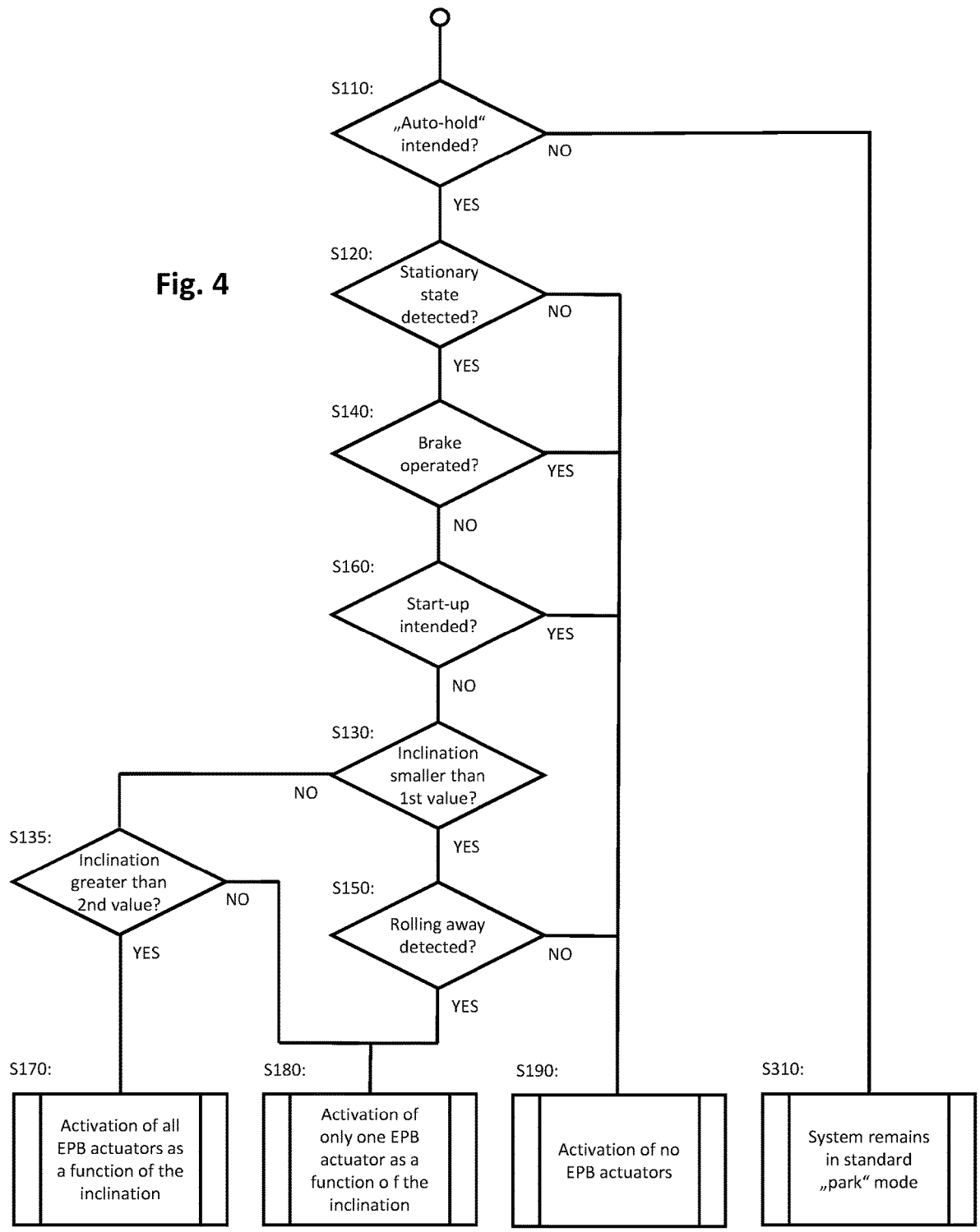

In the following, several exemplary embodiments of methods for preventing a vehicle from rolling away are explained with reference to the flow diagrams in FIGS. 3 to 6. The methods can be executed using the control unit ECU shown in FIG. 2 or a control unit configured otherwise. FIGS. 3 and 4 each represent a complete process cycle here, while FIGS. 5 and 6 illustrate expansions or details of these process cycles. In connection with the flow diagrams in FIGS. 3 and 4, it is assumed that the EPB actuators 13, 43 are located in their open state at the beginning of the respective process cycle.

Referring to the flow diagram in FIG. 3, it is first queried in step S110 whether the starting assistance system 88 is activated and thus the starting mode has been selected. The starting assistance system 88 can be activated by the driver via a separate input device (a switch or button, for instance), for example, and thus switched to readiness. It is self-evident that depending on the system design, automatic activation of the starting assistance system 88 can also take place, in order to switch this automatically to readiness. Such an automatic activation can take place if indications exist to the effect that a standard "park" mode (thus a conventional activation of the EPB actuators 13, 43 for permanent stoppage of the vehicle) is not intended. Such indications can comprise one or more of the following conditions: driver door is closed, driver is belted in, ignition is switched on, transmission is operated, gear is engaged.

If it is established in step S110 that the starting assistance system 88 is not activated, the EPB remains in standard "park" mode in step S310. The "park" mode permits an activation of both EPB actuators 13, 43 by the driver by means of the input device explained above for permanent stopping of the vehicle.

If the starting assistance system 88 is activated, on the other hand, the signal of the state of motion sensor system 82 is evaluated in step S120 in order to determine whether the vehicle is in a stationary state. As already explained above, the control unit ECU can evaluate the wheel speeds for this purpose. If it is determined in step S120 that the vehicle is still moving, the method branches to step S190. In step S190 no activation of the EPB actuators 13, 43 takes place, but the starting mode still remains active.

If a vehicle standstill is detected in step S120, on the other hand, the signal of the inclination sensor system 80 is evaluated in step S130. Specifically, the inclination of the road on which the vehicle is currently located is determined. If it turns out in this case that the road inclination is below a first threshold value of approximately 2 degrees, for example, the method continues with step S140.

In step S140 a signal of the service brake sensor system 86 is evaluated to determine whether the driver is (still) operating the service brake. As explained above, the position of the brake pedal or the state of the brake light switch, for example, can be queried in this connection. If an indication is ascertained in step S140 to the effect that the driver himself would like to retain control of the stopping of the vehicle, the method continues with step S190. In consequence neither of the EPB actuators 13, 43 is activated and both EPB actuators 13, 43 remain open.

If it is detected in step S140, on the other hand, that the driver is not (no longer) operating the service brake, the state of motion sensor system 82 is interrogated afresh in a following step S150. It is specifically determined whether the vehicle is actually in a stationary state. If this is the case, thus if no rolling away of the vehicle is detected, the method continues in turn with step S190. Thus neither of the EPB actuators 13, 43 is activated.

If rolling away of the vehicle is detected in step S150, the intention to start sensor system 84 is interrogated in step S160, in order to check whether a start-up of the vehicle is intended. As explained above, the intention to start can be determined with reference to an actuation of the accelerator pedal or the clutch pedal, for example. If an intention to start exists, the method continues in turn with step S190, so that an activation of the EPB actuators 13, 43 is suppressed.

If, on the other hand, it is determined in step S160 that no start-up of the vehicle is intended, an activation of a single one of the two EPB actuators 13, 43 takes place in step S180 to generate brake force. In other words, the EPB actuator 13, for example, is activated, while the EPB actuator 43 is not activated (and therefore remains open).

In step S180 the control unit ECU first selects the one of the two EPB actuators 13, 43 that is to be actuated to generate a brake force at the associated vehicle wheel VL, VR. The selection is based on an actuation history of the two EPB actuators 13, 43 filed in the memory 72 and according to long-term uniform usage of the two EPB actuators 13, 43. The two EPB actuators 13, 43 can specifically be selected alternately, for example, in each run-through of the flow diagram illustrated in FIG. 3.

The aim of the selection in step S180 is to keep the loading and thus the wear of the collective of the two EPB actuators 13, 43 as low as possible. Furthermore, the selected EPB actuator 13 or 43 is activated for this purpose as a function of the road inclination determined in step S130. The greater the angle of inclination determined in step S120, the higher the clamping force of the selected EPB actuator 13 or 43 and thus the brake force generated at the associated vehicle wheel. The dependence of the clamping force on the angle of inclination (instead of a complete clamping of the selected EPB actuator 13 or 43) is another measure for keeping the wear of the collective of the two EPB actuators 13, 43 low.

If the query in step S130 reveals, on the other hand, that the road inclination is not smaller than the first threshold value, the method branches to step S135. In step S135 it is determined whether the road inclination is above a second threshold value that is greater than the first threshold value. If it is determined in step S120 that the road inclination is not smaller than the first threshold value and not greater than the second threshold value, the method branches likewise to step S180, so that an inclination-dependent activation of a single one of the two EPB actuators 13, 43 takes place. In one implementation of the step S180, two different clamping forces are defined for the selected EPB actuator 13 or 43. The selected EPB actuator 13 or 43 is activated according to the first value if the inclination is smaller than the first threshold value, and according to the second value if the road inclination is above the first threshold value but below the second threshold value.

If it is determined in step S135, on the other hand, that the road inclination is above the second threshold value, an activation of both EPB actuators 13, 43 takes place in step S170. In step S170 also the activation of the two EPB actuators 13, 43 takes place as a function of the road inclination, in order to keep the loading of the two EPB actuators 13, 43 low. In a diverging embodiment, the two EPB actuators 13, 43 could be activated in step S170 in such a way that they each develop their maximum clamping force.

In summary, in a "maximally small" road inclination, for example below a first threshold value of 2 degrees, only a single EPB actuator 13 or 43 is activated as a function of the road inclination if (when the starting assistance system is activated), following a detected stationary state of the vehicle in step S120, rolling away of the vehicle is detected in step S150. If the road inclination is "small", thus lies above the first threshold value, but not above the second threshold value at roughly 5 degrees, for example, likewise only a single EPB actuator 13 or 43 is activated. However, the activation takes place to generate a higher clamping force than in a "maximally small" road inclination below the first threshold value. In the event of a "medium" road inclination above the second threshold value (and if applicable below a third threshold value), both EPB actuators 13, 43 are activated as a function of the inclination, on the other hand. According to another exemplary embodiment, a third threshold above the second threshold value can be provided. If the road inclination is above the third threshold value of 10 degrees, for example, an activation of both EPB actuators 13, 43 takes place in such a way that both EPB actuators 13, 43 develop their maximum clamping force.

FIG. 4 illustrates in a flow diagram another exemplary embodiment of a method for preventing a vehicle from rolling away. The exemplary embodiment according to FIG. 4 is based on the exemplary embodiment according to FIG. 3, so that the same reference signs have been used for the use of comparable steps. In the following only the differences between the two exemplary embodiments according to FIGS. 3 and 4 are therefore considered.

As is clear from FIG. 4, it is provided in this exemplary embodiment as compared to the exemplary embodiment according to FIG. 3 that the query of step S140 (Service brake operated?) and the query of step S160 (Start-up intended?) are executed immediately after the step S120 (stationary state of the vehicle detected). In this way control over the stopping of the vehicle is left to the driver even in the case of "small" and "medium" road inclinations. The loading of the EPB actuators 13, 43 can be reduced further in this way.

FIG. 5 illustrates in a flow diagram an exemplary embodiment for the activation of the selected EPB actuator 13 or 43 as a function of the road inclination according to step S180. As explained in connection with FIG. 3, step S180 is executed in the case of "slight" and "small" road inclinations (thus inclinations below the first threshold value or between the first threshold value and the second threshold value). In this case it is initially queried in step S210 by accessing the actuation history in the memory 72 which of the two EPB actuators 13 or 43 was activated in the last execution of step S180. If the EPB actuator 13 was last activated, then according to step S230 (only) the EPB actuator 43 is selected and activated as a function of inclination. If on the other hand the EPB actuator 43 was last activated, then in step S220 (only) the EPB actuator 13 is selected and activated as a function of inclination.

FIG. 6 shows an expansion of the exemplary embodiment according to FIG. 5. In this case, after inclination-dependent activation of one of the two EPB actuators 13 or 43 according to step S220 or step S230, it is queried in two further steps S250 or S255 respectively (by analogy with step S150) whether the vehicle actually remains in a stationary state.

If no rolling away of the vehicle is detected in the respective step S250 and S255, no further activation of the EPB actuators 13, 43 takes place. This means that the activation of the selected EPB actuator 13 or 43 undertaken according to step S250 or step S230 and the brake force accompanying it is retained at only one vehicle wheel VL or VR. If a rolling away of the vehicle is detected in the respective step S250 or step S230, on the other hand, an inclination-dependent activation of both EPB actuators 13, 43 takes place in step S270, in order to hold the vehicle securely in a stationary state. In other words, a brake force is built up by both EPB actuators 13, 43 in step S270.

The situation outlined in FIG. 6 is based on the observation that even with "slight" or "small" road inclinations, it can occur that the vehicle rolls away, or expressed another way, "slides" because the one EPB actuator 13 or 43 only generates a brake force at one vehicle wheel VL or VR, while the individual wheels VL, VR are exposed to different road friction coefficients. The accompanying sliding away of the vehicle upon closing only one of the two EPB actuators 13 or 43 can be counteracted by closing both EPB actuators 13, 43 in step S270.

In the exemplary embodiments described above, a motor vehicle braking system was described with four vehicle wheels and two EPB actuators. It is self-evident that the present disclosure is also applicable to motor vehicles with more or fewer vehicle wheels and to braking systems with more than two EPB actuators. In the case of more than two EPB actuators, to minimize wear only one genuine subset of the EPB actuators available is activated respectively to generate brake force in the event of the conditions explained here occurring together.

A joint occurrence of the conditions is assumed if the conditions are detected simultaneously or substantially simultaneously. On account of the time duration of individual processing steps inherent in the system, the occurrence of the conditions is typically checked singly and thus at different times. To this extent it is sufficient if the individual conditions occur together in the framework of a single process cycle, as illustrated in FIG. 3 and FIG. 4, for example.

The instruction of the present disclosure explained with reference to the exemplary embodiments permits a reduction in the wear of a collective of two or more EPB actuators. The accompanying maintenance effort is thus also reduced.

Furthermore, the prevention of rolling away takes place at least in some variants without the necessity of an accompanying hydraulic pressure build-up. The instructions presented here can therefore be implemented independently of whether the relevant vehicle permits a driver-independent hydraulic pressure generation. In particular, the instruction can be implemented independently of whether the vehicle is equipped with a vehicle dynamics control system.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A system for preventing a vehicle from rolling away, wherein the system comprises the following:
an electric parking brake, with a first actuator, which is assigned to a first vehicle wheel, and a second actuator, which is assigned to a second vehicle wheel;
a first device, which is formed to generate a first signal, which indicates a road inclination;
a second device, which is formed to generate a second signal, which indicates a state of motion of the vehicle;
wherein the system is formed to activate one of the two actuators in order to generate a brake force either at the first vehicle wheel or the second vehicle wheel if the following conditions have occurred together: the first signal indicates a road inclination below a first threshold value and the second signal indicates a rolling away of the vehicle from the stationary state and;
wherein the system is formed to select either the first actuator or the second actuator in order to generate a brake force at either the first vehicle wheel or the second vehicle wheel, and to make the selection as a function of an actuation history of the first actuator and/or the second actuator.

2. The system according to claim 1, wherein the system is formed to monitor a time progression of the second signal, in order to detect rolling away following a detected stationary state of the vehicle.

3. The system according to claim 1, wherein the first threshold value is 3 degrees or less.

4. The system according to claim 1, further comprising:
a third device, which is formed to generate a third signal, which indicates an intention to start; and
wherein the system is formed to activate one of the two actuators in order to generate a brake force at either the first vehicle wheel or the second vehicle wheel if the following further condition has occurred:
no third signal is received indicating an intention to start.

5. The system according to claim 1, further comprising
a fourth device, which is formed to generate a fourth signal, which indicates an actuation state of a service brake of the vehicle; and
wherein the system is formed to activate one of the two actuators, in order to generate a brake force at either the first vehicle wheel or the second vehicle wheel if the following further condition has occurred:
no fourth signal is received indicating an actuation of the service brake.

6. The system according to claim 1, further comprising
a fifth device, which is configured to generate a fifth signal, which indicates an activation of an automatic starting assistance system; and
wherein the system is formed to activate one of the two actuators, in order to generate a brake force at either the first vehicle wheel or the second vehicle wheel if the following further condition has occurred:
the fifth signal indicates an activation of the automatic starting assistance system.

7. The system according to claim 1, wherein the system is formed to select a level of the brake force generated as a function of the road inclination.

8. The system according to claim 1, wherein the system is formed to make the selection as a function of an actuation history of the first actuator and/or the second actuator in such a way that the two actuators are selected substantially alternately.

9. The system according to claim 1, wherein the system is formed to generate, following the activation of one of the two actuators, a brake force at either the first vehicle wheel or the second vehicle wheel, to monitor the state of motion of the vehicle further with reference to the second signal and to increase the brake force at the previously activated actuator and/or additionally to generate a brake force by means of the previously not yet activated actuator if the rolling away continues or begins anew.

* * * * *